(12) United States Patent
Hiraguchi

(10) Patent No.: US 6,962,303 B2
(45) Date of Patent: Nov. 8, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/935,072

(22) Filed: Sep. 8, 2004

(65) Prior Publication Data

US 2005/0051658 A1   Mar. 10, 2005

(30) Foreign Application Priority Data

Sep. 9, 2003 (JP) ............................. 2003-316584

(51) Int. Cl.$^7$ .......................................... G11B 23/107
(52) U.S. Cl. ............................... 242/332.4; 242/348.2
(58) Field of Search ....................... 242/332.4, 348, 242/348.2, 532, 532.1; 360/132

(56) References Cited

U.S. PATENT DOCUMENTS

| | | | | |
|---|---|---|---|---|
| 4,977,474 A | * | 12/1990 | Oishi et al. ............... | 242/348.2 |
| 5,232,180 A | | 8/1993 | Hoge et al. | |
| 5,465,187 A | * | 11/1995 | Hoge et al. ............... | 360/132 |
| 5,868,333 A | * | 2/1999 | Nayak ....................... | 242/348.2 |
| 6,349,892 B2 | * | 2/2002 | Morita et al. ............. | 360/132 |
| 6,739,539 B2 | * | 5/2004 | Hiraguchi et al. ........ | 242/348.2 |
| 6,889,929 B2 | * | 5/2005 | Ishihara .................... | 242/348.2 |
| 6,908,056 B2 | * | 6/2005 | Hiraguchi ................. | 242/348 |

* cited by examiner

*Primary Examiner*—William A. Rivera
(74) *Attorney, Agent, or Firm*—Sughrue Mion, PLLC

(57) ABSTRACT

A recording tape cartridge including: a case rotatably accommodating a single reel on which recording tape is wound; an aperture formed in the case for drawing out the recording tape; a leader block which is fixed to an end portion of the recording tape, can close the aperture, and is drawn out by a drive device drawing-out means when the recording tape is to be drawn out; and a cover member covering at least some of the leader block that closes the aperture. The cover member includes at least a covering portion formed in a substantially circular arc form, which is structured to be reciprocally movable in a direction intersecting a height direction of the case, around a reference point in a vicinity of the leader block, between a release position for releasing the leader block and a covering position for covering at least some of the leader block.

23 Claims, 15 Drawing Sheets

RECORDING TAPE CARTRIDGE

CROSS-REFERENCE TO RELATED APPLICATION

This application claims priority under 35 USC 119 from Japanese Patent Application No. 2003-316584, the disclosure of which is incorporated by reference herein.

BACKGROUND OF THE INVENTION

1. Field of the Invention

The present invention relates to a recording tape cartridge which accommodates, in a case, a single reel onto which recording tape such as a magnetic tape or the like is wound, principally for use as a recording/replaying medium for computers and the like.

2. Description of the Related Art

A recording tape cartridge (magnetic tape cartridge) produced by winding magnetic tape, which serves as recording tape to be used as a data recording/replaying medium for a computer or the like, onto a single reel and accommodating this reel in a case made of synthetic resin has been known hitherto.

At a distal end (free end) of a magnetic tape thereof, a leader member, such as a leader pin, a leader tape, a leader block or the like is fixed. Drawing-out means, which is provided at a drive device, draws the leader member out through an opening aperture of the recording tape cartridge and winds the magnetic tape, which is fixed to the leader member, onto a winding reel of the drive device.

A circular opening is formed through a lower face of the recording tape cartridge, and a reel gear is provided in an annular form at a center of the lower face of the reel and exposed through this opening. A drive gear, which is provided at a rotation shaft of the drive device, meshes with the reel gear. With this structure, the reel is driven to rotate. Accordingly, when the reel of the recording tape cartridge and the winding reel of the drive device are rotated synchronously, data can be recorded to the magnetic tape and/or data that has been recorded to the magnetic tape can be replayed.

At a recording tape cartridge with such a structure, the leader member is a coupling member which is coupled with the drive device side winding reel in a state in which the magnetic tape is pulled tight. However, a position of the opening aperture formed in the case and types of a door that opens and closes the opening aperture and so forth are different for each type of leader member. For example, in a case with a leader block, the opening aperture is formed at a corner portion at a side in a direction of loading of the recording tape cartridge (the case) into a drive device, and the leader block is engaged so as to close off the opening aperture. That is, the leader block is structured so as to also serve as a door for closing the opening aperture.

This leader block is structured by a stiff body. Therefore, in comparison to a tape-form leader tape, an operation of engagement with the drive device side drawing-out means can be performed more easily, which is advantageous in that abrasion and damage to an engaging portion of the drawing-out means is less likely to occur.

Furthermore, when the opening aperture is at the corner portion of the case, this is advantageous in that an angle of drawing out the leader block can be freely selected in design of a drive device. For example, design is possible so as to draw out the leader block along a shortest distance to the winding reel, and design is possible so as to complete the operation of drawing out the magnetic tape in a short time.

However, if a leader block is engaged at a corner portion of a recording tape cartridge (a case) at times of non-use (when the recording tape cartridge is not loaded at a drive device), there is a problem in that if an impact is applied to the corner portion, due to dropping or the like, it is likely that the case will be warpingly deformed and that the leader block will fall out from the corner portion.

When the leader block is detached and thrown out from the case due to dropping or the like, a user will be subjected to concern as to whether such an incident has affected the basic functionality of the recording tape cartridge, and will also be subjected to concern as to whether or not the recording tape cartridge will operate in the drive device if repaired by hand.

In practice, there have been cases in which creases are formed in the magnetic tape when the leader block detaches from the case due to being dropped.

Furthermore, when the leader block improperly detaches, because the leader block itself functions as a door, there is a problem in that dustproofing of the recording tape cartridge is breached.

Accordingly, it has been thought heretofore that impacts due to dropping and the like can be mitigated and effects on the leader block kept to a minimum by, for example, forming the corner portion in a form which is itself easily deformed by warping. However, such structures by themselves have been insufficient as countermeasures for preventing detachment of leader blocks.

Accordingly, as shown in FIGS. 14A and 14B, for example, provision of a flat plate-form engaging member 120 at a pair of support members 116 has been considered. The pair of support members 116 are provided standing apart by a predetermined spacing at an inner face of a case 112 in a vicinity of an opening 114 of a recording tape cartridge 110. A shaft portion 122, which is formed at one end of the engaging member 120, is rotatably and horizontally disposed at the pair of support members 116. A protrusion 124, which is formed at the other end of the engaging member 120, engages with an engaging groove 128. The engaging groove 128 is formed at a fixing portion 130B end side of a leader block 130, at which side the magnetic tape is attached. (See, for example, the specification of U.S. Pat. No. 5,232,180.)

At a time of non-use of the recording tape cartridge 110, as shown in FIG. 14A, the protrusion 124 of the engaging member 120 engages with the engaging groove 128 of the leader block 130, and detachment of the leader block 130 from the case 112 is prevented. Then, at a time of use of the recording tape cartridge 110, as shown in FIG. 14B, a release member 126 enters through an aperture 118, which is formed through the case 112, and the aforementioned other end of the engaging member 120, including the protrusion 124, is pushed up by the release member 126. The engaging member 120 rotates upward about the shaft portion 122, as a result of which the protrusion 124 is removed from the engaging groove 128. Consequently, the leader block 130 can be taken out from the case 112.

However, because this engaging member 120 is a structure in which the shaft portion 122 is horizontally disposed at the pair of support members 116 which are provided standing apart by the predetermined spacing at the inner face of the case 112 and the engaging member 120 rotates upward about the shaft portion 122 to be removed from the engaging groove 128, there is a problem in that it is necessary to provide a large amount of space for disposition of the engaging member 120 in the vicinity of the opening 114.

That is, as shown in FIG. 15A, because the pair of support members 116 are provided standing apart by the predetermined spacing, space is required in a lateral direction of the case 112 (a direction intersecting a height direction of the case 112), and as shown in FIG. 15B, because the release stroke is at least as high as a height of the leader block 130, space is required in the height direction of the case 112. Thus, the large amount of space for disposition is required in the vicinity of the opening 114, and the recording tape cartridge 110 is made larger, which is problematic.

SUMMARY OF THE INVENTION

In accordance with the situation described above, the present invention will provide a recording tape cartridge which is not subject to concern about detachment of a leader block when a case thereof is subjected to an impact due to dropping or the like, without a disadvantage such as enlargement.

In a first aspect of the present invention, a recording tape cartridge includes: a case rotatably accommodating a single reel on which recording tape is wound; an aperture formed in the case, for drawing out the recording tape; a leader block fixed to an end portion of the recording tape, being capable of closing the aperture, and being drawn out by drawing-out means of a drive device at a time of drawing out the recording tape; a cover member covering at least a portion of the leader block that is closing the aperture; and a support point portion protruding from the case and supporting the cover member to be rotatable in a direction intersecting a height direction of the case.

In the present aspect, the recording tape cartridge is provided with the cover member, which covers at least a portion of the leader block that is closing the aperture. Thus, at times of non-use, even if, for example, the recording tape cartridge is dropped on a corner portion, the leader block will be constrained by the cover member. Therefore, there is no concern about detachment of the leader block from the case.

Further, because this cover member rotates in the direction which intersects the height direction of the case, space for disposition of the cover member in the height direction is not required in the case. Therefore, there is no problem of the recording tape cartridge being made larger.

In a second aspect of the present invention, the cover member includes structure such that the cover member rotates in a direction for releasing the leader block in accordance with loading of the cartridge into the drive device.

In the present aspect, because the cover member is structured so as to rotate in the direction of releasing the leader block in accordance with loading into a drive device, there is no need for a user to turn the cover member when loading the recording tape cartridge at the drive device. Therefore, ease of handling of the recording tape cartridge is not adversely affected when this sort of cover member is provided.

In a third aspect of the present invention, the cover member is urged in a direction for covering the leader block.

In the present aspect, the cover member is urged in the direction of covering the leader block, and at times of non-use, the cover member automatically covers the leader block. Therefore, even if the recording tape cartridge is, for example, dropped on the corner portion, the leader block is continuously constrained by this cover member, and there is no concern about disengagement of the leader block from the case.

In a fourth aspect of the present invention, the case is formed by joining together an upper case and a lower case by screw-fixing, and the support point portion is a screw boss thereof.

In the present aspect, because the support point portion is formed as a screw boss for joining together the upper case and the lower case (i.e., functions dually as the screw boss and the support point portion), there is no need to specifically form a support point portion in the case. Thus, when the cover member is provided, the form of the case interior does not become more complicated.

In a fifth aspect of the present invention, a recording tape cartridge includes: a case rotatably accommodating a single reel on which recording tape is wound; an aperture formed in the case, for drawing out the recording tape; a leader block fixed to an end portion of the recording tape, being capable of closing the aperture, and being drawn out by drawing-out means of a drive device at a time of drawing out the recording tape; a cover member covering at least a portion of the leader block that is closing the aperture; and a guide wall portion standing from the case and supporting the cover member to be slidable in a direction intersecting a height direction of the case.

In the present aspect, the recording tape cartridge is provided with the cover member, which covers the at least a portion of the leader block that is closing the aperture. Thus, at times of non-use, even if, for example, the recording tape cartridge is dropped on a corner portion, the leader block will be constrained by the cover member. Therefore, there is no concern about detachment of the leader block from the case.

Further, because this cover member slides in the direction which intersects the height direction of the case, space for disposition of the cover member in the height direction is not required in the case. Therefore, there is no concern of the recording tape cartridge being made larger.

In a sixth aspect of the present invention, the cover member of the recording tape cartridge according to the fifth aspect includes structure such that the cover member slides in a direction for releasing the leader block in accordance with loading of the cartridge into the drive device.

In the present aspect, because the cover member is structured so as to slide in the direction of releasing the leader block in accordance with loading into a drive device, there is no need for a user to slide the cover member when loading the recording tape cartridge at the drive device. Therefore, ease of handling of the recording tape cartridge is not adversely affected when this sort of cover member is provided.

In a seventh aspect of the present invention, the cover member of the recording tape cartridge according to the fifth aspect is urged in a direction for covering the leader block.

In the present aspect, the cover member is urged in the direction of covering the leader block, and at times of non-use, the cover member automatically covers the leader block. Therefore, even if the recording tape cartridge is, for example, dropped on the corner portion, the leader block is continuously constrained by this cover member, and there is no concern about disengagement of the leader block from the case.

Anyway, in conclusion, according to the present invention, even if an impact is applied by a fall or the like, there is no risk that the leader block will fall out from the recording tape cartridge (the case).

DETAILED DESCRIPTION OF THE INVENTION

Herebelow, embodiments of the present invention will be described in detail with reference to the drawings. For convenience of explanation, a loading direction of a recording tape cartridge 10 into a drive device is shown as arrow A, and is regarded as a forward direction (front side) of the recording tape cartridge 10. The direction of an arrow B, which intersects arrow A, is regarded as a rightward direction (right side).

First Embodiment

Figure 1:
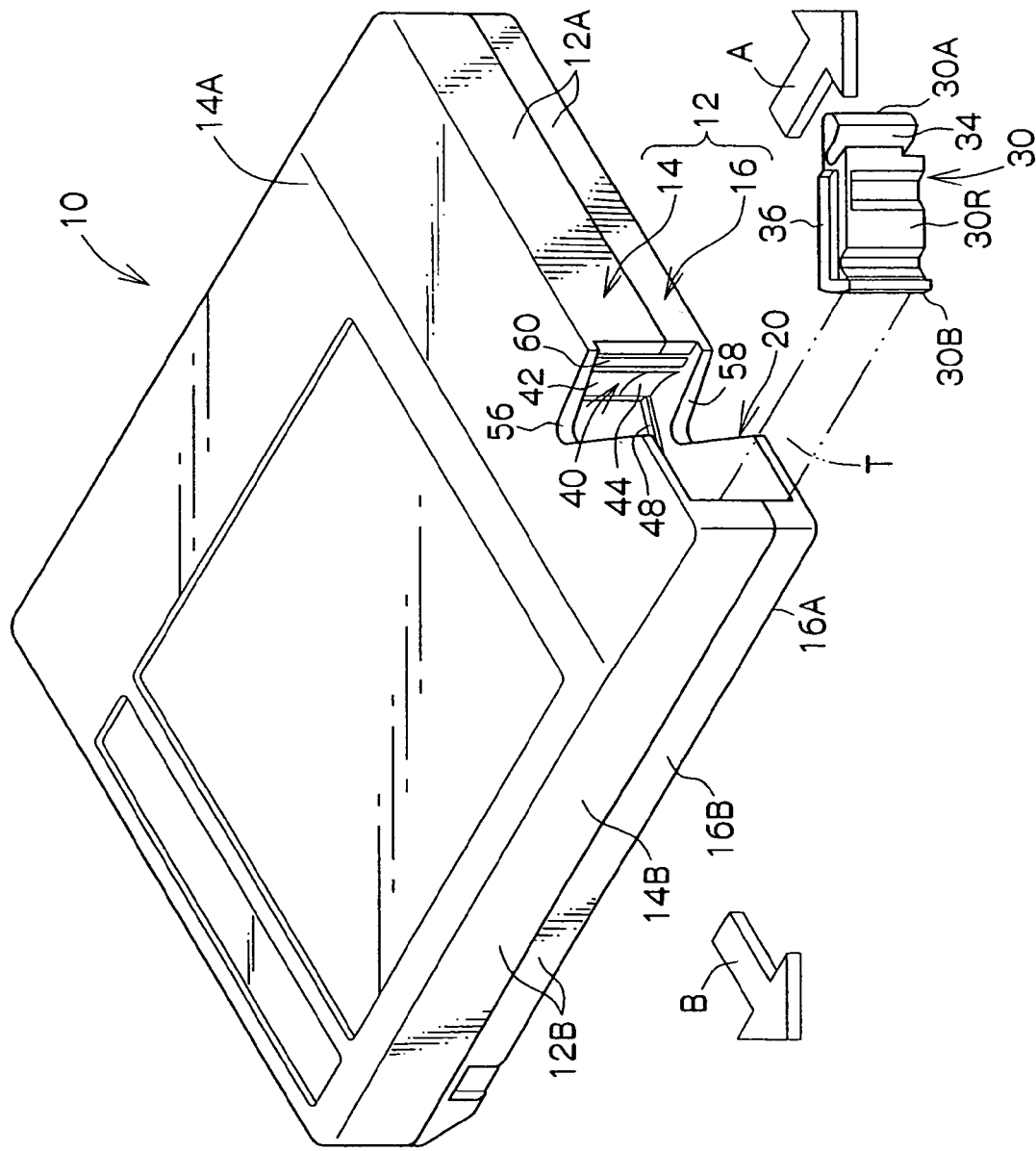
FIG. 1 is a schematic perspective view of a recording tape cartridge of the present invention, seen from above.
Figure 2:
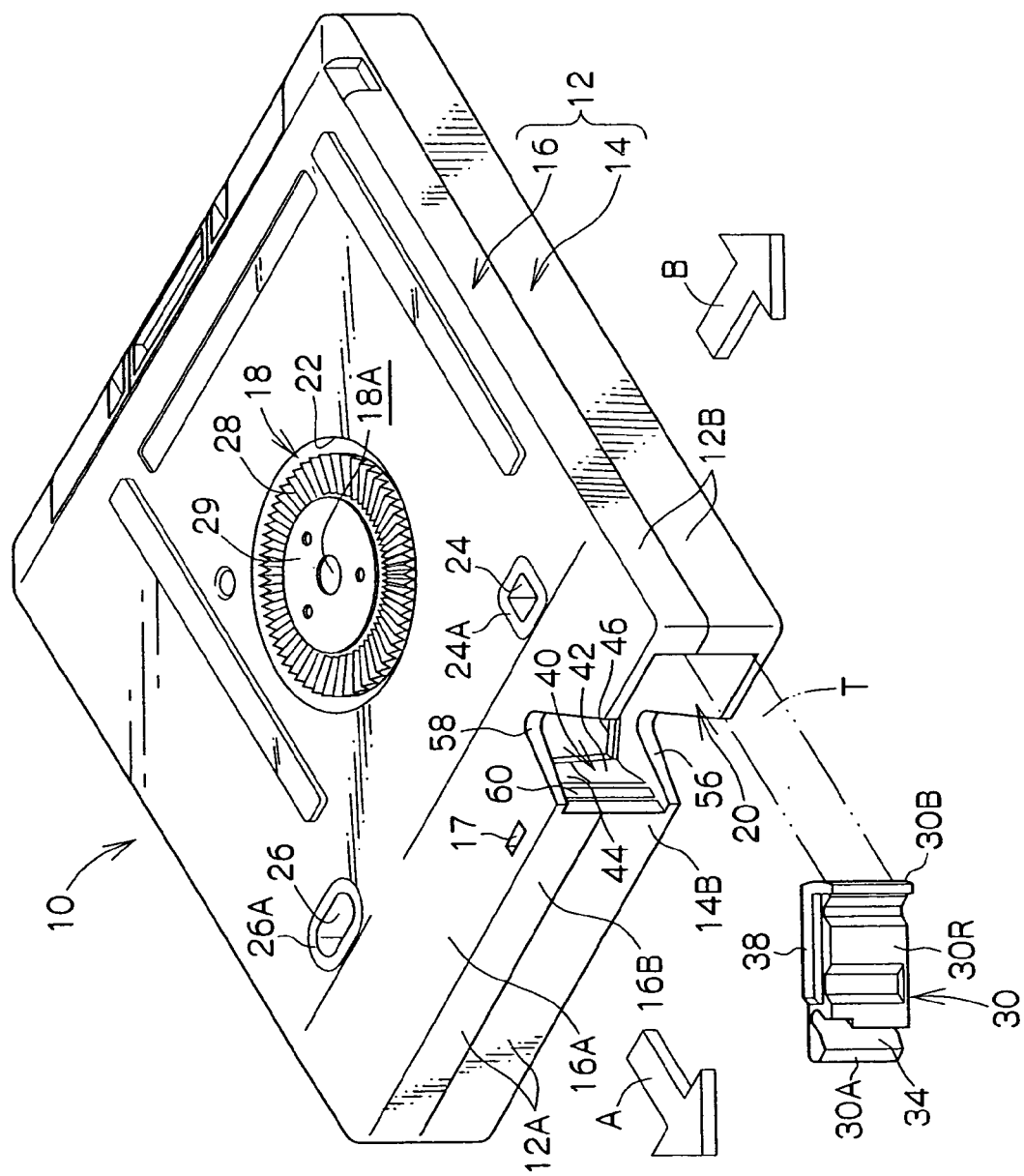
FIG. 2 is a schematic perspective view of the recording tape cartridge of FIG. 1, seen from below.

First of all, a first embodiment will be described. As shown in FIGS. 1 and 2, the recording tape cartridge 10 is provided with a case 12. The case 12 is structured by joining together an upper case 14 and a lower case 16.

More specifically, the upper case 14 is structured with a substantially frame-like peripheral wall 14B provided standing along outer edges of a ceiling plate 14A which is substantially rectangular in plan view, and the lower case 16 is structured with a peripheral wall 16B provided standing along outer edges of a floor plate 16A with a form which substantially corresponds with the ceiling plate 14A.

Thus, the case 12 is formed in a substantially rectangular box form by, in a state in which the opening end of the peripheral wall 14B and the opening end of the peripheral wall 16B are matched up, joining the upper case 14 with the lower case 16 by fixing with screws. Here, it is preferable if screw bosses 15 are provided at least at each of corner portions (see FIGS. 3 to 6). With such a structure, secure joining at each corner portion is possible.

Note that means for joining the upper case 14 with the lower case 16 is not limited to screw-fixing, and joining by ultrasonic welding or the like is also possible.

An aperture 20 is formed in the case 12 for drawing out a magnetic tape T, which is wound on a later-described reel 18, to outside the case 12. The aperture 20 is formed at a predetermined position of a peripheral wall (below referred to as a front wall) 12A which is at the side of the direction of loading of the case 12 into a drive device. Specifically, the aperture 20 is formed at a position which is spaced from a right corner portion toward a left corner portion of the front wall 12A by at least a plate thickness of the case 12.

Thus, because the aperture 20 is formed in the peripheral wall (the front wall 12A) apart from the corner portion, a leader block 30, which is described later, will be disposed at a position which is separated from the corner portion. Therefore, the leader block 30 will be less likely to detach from the case 12 if the recording tape cartridge 10 is dropped on the corner portion.

A circular gear aperture 22 which passes through the floor plate 16A is formed at a substantially central portion of the floor plate 16A, for exposure of a reel gear 28 which is formed at the reel 18. At a portion of the floor plate 16A at a peripheral edge of the gear aperture 22, an annular rib 23 (see FIGS. 3 to 6) is provided protruding toward the inside of the case 12. At times of non-use, the reel 18 is positioned relative to the lower case 16 by an outer peripheral side of the reel gear 28 being placed on this annular rib 23.

A pair of positioning holes 24 and 26 is formed at a front end vicinity of an outer face of the floor plate 16A of the case 12. The two positioning holes 24 and 26 are provided in the form of pockets in protrusion portions (not shown), which are provided standing from the floor plate 16A to the inside of the case 12. The positioning holes 24 and 26 are disposed to be spaced from one another along an imaginary line which intersects the loading direction. The positioning hole 24, which is at the side closer to the aperture 20, is formed in a substantially square shape, in bottom plan view, which contacts the outside of a positioning pin (not shown) of a drive device; and the positioning hole 26 is formed as a long hole with length along the aforementioned imaginary line and a width corresponding to the diameter of another positioning pin (not shown) of the drive device. Accordingly, when the recording tape cartridge 10 is loaded in a drive device and the respective positioning pins are inserted into the positioning holes 24 and 26, the recording tape cartridge 10 will be accurately positioned in horizontal directions (left-right and front-rear) in the drive device.

Portions of the floor plate 16A around the positioning holes 24 and 26 are formed as reference surfaces 24A and 26A, which are finished more smoothly than other portions (which are design surfaces). When the positioning pins are inserted into the positioning holes 24 and 26, the positioning surfaces 24A and 26A abut against positioning surfaces (not shown) of the drive device, which are provided around the positioning pins. Thus, this is a structure which is effective for positioning the recording tape cartridge 10 in a vertical direction in the drive device.

Note that the positioning holes 24 and 26 are not limited to the positions shown in the drawings, and either may be provided at a rearward side. That is, the positioning holes 24 and 26 may be provided on a substantially diagonal line across the floor plate 16A (or in vicinities of such a diagonal line).

Only one of the reel 18 is rotatably accommodated inside the case 12 described above. The magnetic tape T, which serves as a recording tape, is wound on at the reel 18. The reel gear 28 is formed in an annular shape at a lower face of the reel 18. The reel gear 28 is formed to be meshable with a driving gear (not shown) which is provided at a distal end of a rotating shaft (not shown) of the drive device.

A reel plate 29, which is an annular plate formed of a magnetic material, is coaxially and integrally fixed at an inner side of the reel gear 28 by insert-molding or the like.

The leader block 30 is attached to a distal end of the magnetic tape T, for drawing out the magnetic tape T. Specifically, a fitting recess portion (not shown), which is substantially rectangular in side view, is formed from a left side face 30L to a rear end 30B of the leader block 30. A fitting member 32 with a substantially rectangular form (see FIGS. 7 and 8) fits into this fitting recess portion and nips a distal end portion of the magnetic tape T. As a result, the leader block 30 is fixed at the distal end of the magnetic tape T. Accordingly, a width of the fitting member 32 (a length in the height direction) is equal to or slightly larger than a width of the magnetic tape T.

The rear end 30B of the leader block 30 has a circular arc surface which, when the leader block 30 is fitted into the drive device side winding reel (not shown), structures a portion of a winding surface around which the magnetic tape T is to be wound. The magnetic tape T is attached substantially at a center of the rear end 30B.

A front end 30A of the leader block 30 is formed in, for example, a substantially circular arc form in plan view (but is not limited to the form illustrated), and an engaging recess portion 34 is formed in a vicinity of the front end 30A. The engaging recess portion 34 engages with a drawing-out member (not shown) which structures drawing-out means of the drive device. This engaging recess portion 34 is constituted by a curved surface, which forms a substantially semi-circular shape in plan view, and a straight line which is continuous with the curved surface.

Between a left edge portion of the aperture 20 and a screw boss 90, fitting walls 42 and 44 are provided standing, to the same heights as the peripheral walls 14B and 16B, from an inner face of the ceiling plate 14A of the upper case 14 and an inner face of the floor plate 16A of the lower case 16, respectively. A recess portion 40 is formed in a right side face of the fitting walls 42 and 44, and matches an external profile of the front end 30A of the leader block 30.

Figure 7:
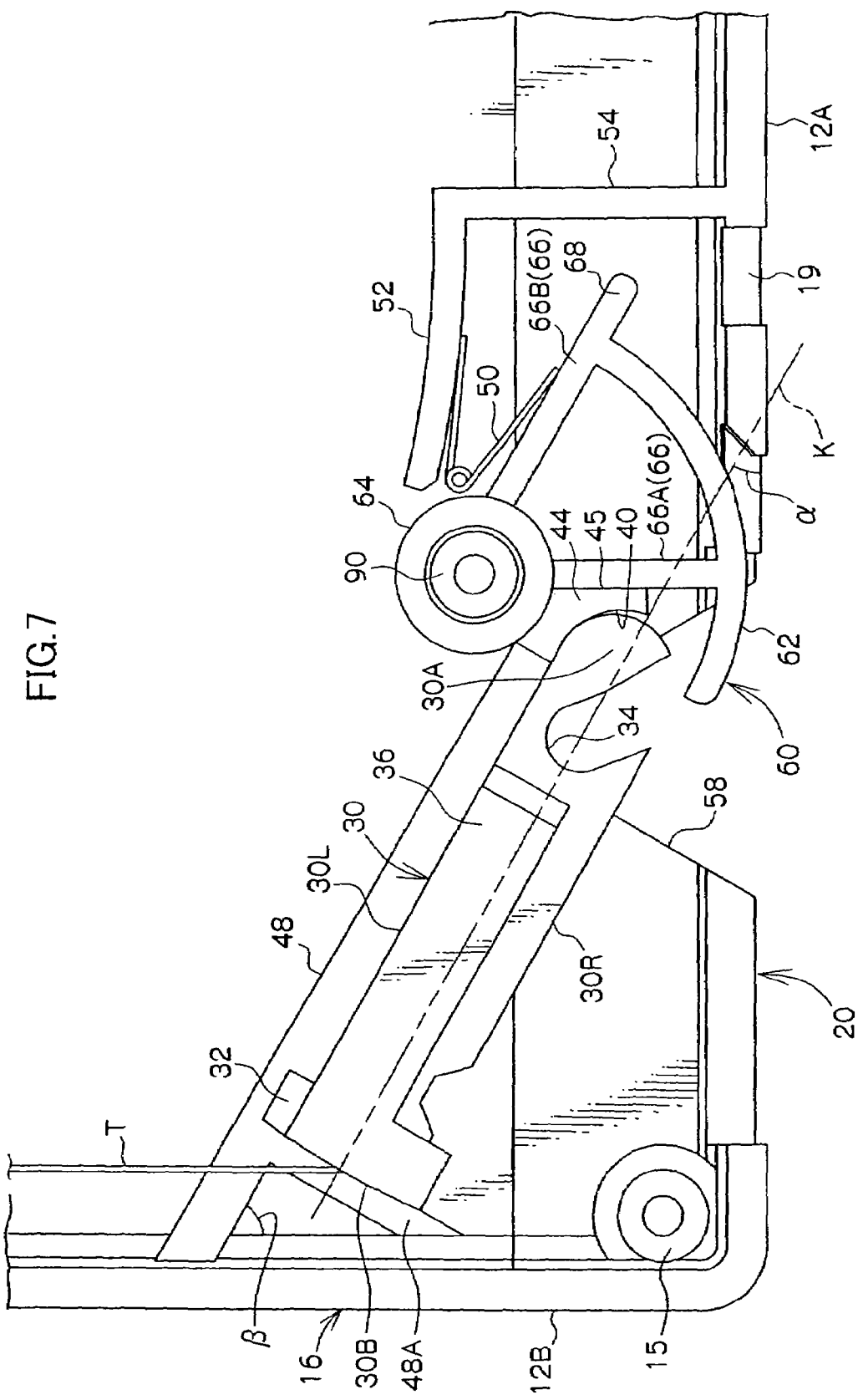
FIG. 7 is a schematic plan view showing the state in which the leader block is covered by the cover member according to the modified example of the first embodiment.
Figure 8:
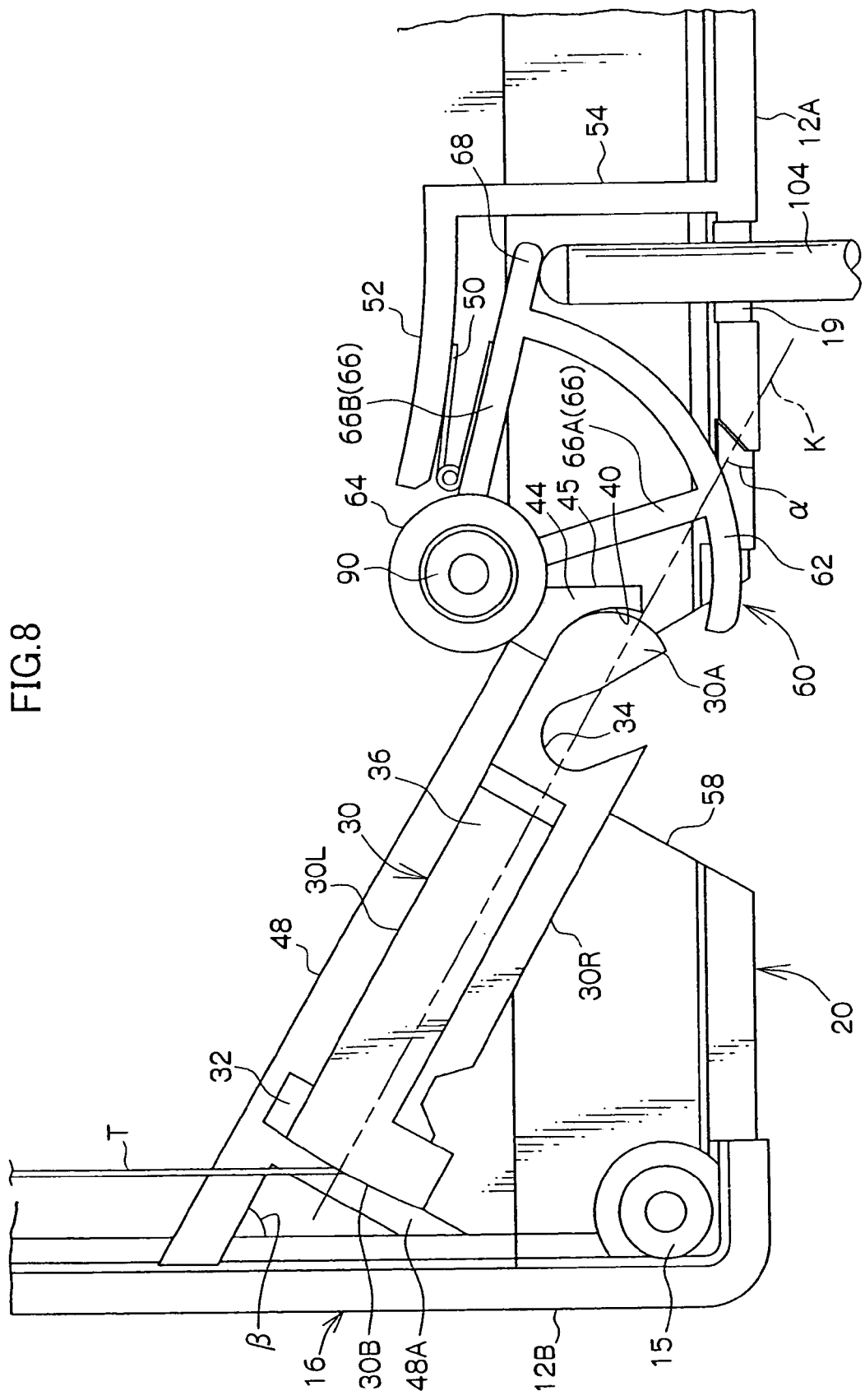
FIG. 8 is a schematic plan view showing the state in which the cover member according to the modified example of the first embodiment is disengaged from the leader block by the release member which is inserted from the front side.

Further, engaging ribs 46 and 48 (only the engaging rib 48 is shown in FIGS. 7 and 8) are standingly provided from the fitting walls 42 and 44 toward a right side peripheral wall (hereafter referred to as a right wall) 12B. The engaging ribs 46 and 48 stand to heights that will not interfere with the magnetic tape T, and are angled by a predetermined angle β in plan view relative to the direction of loading into the drive device (i.e., relative to the right wall 12B).

Further still, in a vicinity of a portion at which the engaging ribs 46 and 48 connect with the right wall 12B, fitting ribs 46A and 48A (only the fitting rib 48A is shown in FIGS. 7 and 8) are provided standing to heights that will not interfere with the magnetic tape T. The fitting ribs 46A and 48A are continuously provided integrally with the engaging ribs 46 and 48 so as to be substantially perpendicular therewith. Circular arc surfaces, which match the external form of the rear end 30B of the leader block 30, are formed at a side of the fitting ribs 46A and 48A of faces thereof that face the front wall 12A.

A cover member 60 is provided at the inner side of the front wall 12A. The cover member 60 covers at least the front end 30A of the leader block 30 in a state which is in contact or a state which is not in contact with the front end 30A. The screw boss 90 is provided protruding from the ceiling plate 14A of the upper case 14 and the floor plate 16A of the lower case 16 in a vicinity of a rear side of the fitting walls 42 and 44. As shown in FIGS. 3 to 8, the cover member 60 is structured to be rotatable in a horizontal direction, that is, a direction intersecting the height direction of the case 12 with the screw boss 90 serving as a support point portion. Further, the cover member 60 is continuously urged in a direction for covering the front end 30A (a rightward direction in the present case) by an urging member 50 such as a torsion spring, a leaf spring, a coil spring or the like (a torsion spring is shown in the drawings).

Thus, when the recording tape cartridge 10 is not in use, in a state in which a right side face 30R of the leader block 30 faces outward, the front end 30A fits in at the recess portion 40 of the fitting walls 42 and 44, and upper and lower end portions (vertical direction outer sides relative to the fitting member 32) of the left side face 30L, which include protruding strip portions 36 and 38, respectively, abut against the engaging ribs 46 and 48. The rear end 30B fits in at the fitting ribs 46A and 48A, and the front end 30A is covered by the cover member 60. Thus, the leader block 30 is retained in the case 12.

That is, as shown in FIGS. 7 and 8, the leader block 30 is accommodated and retained at the inner side of the aperture 20 of the case 12 such that, in plan view, a center line in the length direction of the leader block 30, which is to say an imaginary line K joining a width direction center of the front end 30A (and a center of the engaging recess portion 34 that forms the substantially semi-circular shape in plan view) with a width direction center of the rear end 30B (a position at which the distal end of the magnetic tape T passes into the leader block 30), is angled at a predetermined angle α relative to the front wall 12A ($0°<α<90°$ and $α=90°-β$). Hence, in this state, the aperture 20 is closed by the leader block 30, and ingression of dust or the like into the case 12 is prevented.

It is preferable that the leader block 30 is thus disposed at an angle with respect to the front wall 12A, because the leader block 30 can be drawn out along a shortest distance to the drive device side winding reel and an operation of drawing out the magnetic tape T can be completed in a short time. However, the leader block 30 is not limited to such a position, and may be disposed to be parallel relative to the front wall 12A, and may be disposed so as to be perpendicular to the front wall 12A (i.e., parallel with the right wall 12B).

Cutaway portions 56 and 58, which open wider than the engaging recess portion 34 in plan view, are formed, respectively, in the ceiling plate 14A of the upper case 14 and the floor plate 16A of the lower case 16, which structure upper and lower edge portions of the aperture 20, that is, which structure the aperture 20. The cutaway portions 56 and 58 are formed at positions which correspond with the engaging recess portion 34 of the leader block 30 when the leader block 30 closes off the aperture 20. Consequently, when the leader block 30 is to be drawn out, the drive device side drawing-out member can be easily engaged with the engaging recess portion 34 through the cutaway portions 56 and 58.

Figure 3:
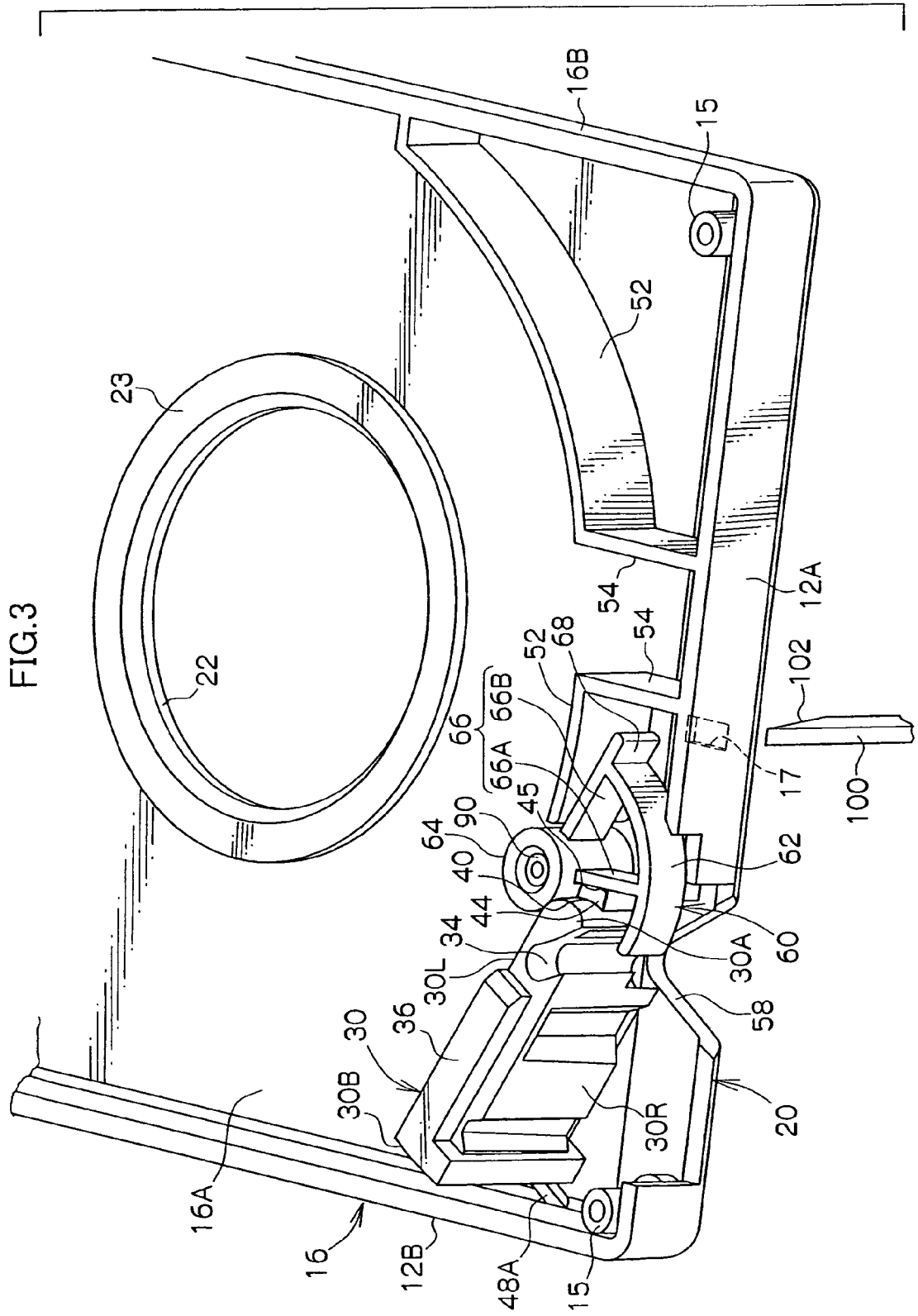
FIG. 3 is a schematic perspective view showing a state in which a leader block is covered by a cover member of a first embodiment of the present invention.
Figure 4:
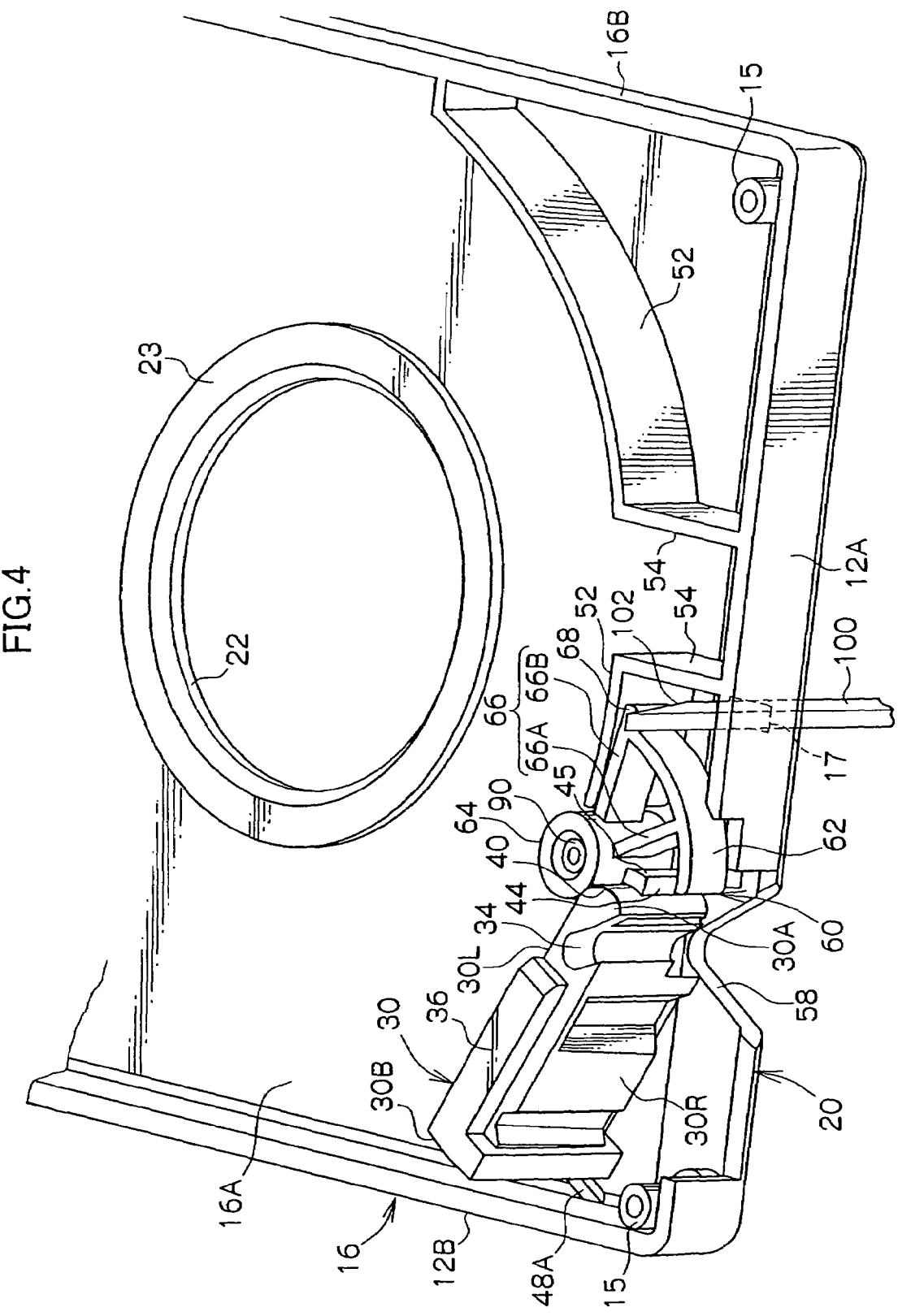
FIG. 4 is a schematic perspective view showing a state in which the cover member of the first embodiment is removed from the leader block by a release member which is inserted from below.
Figure 5:
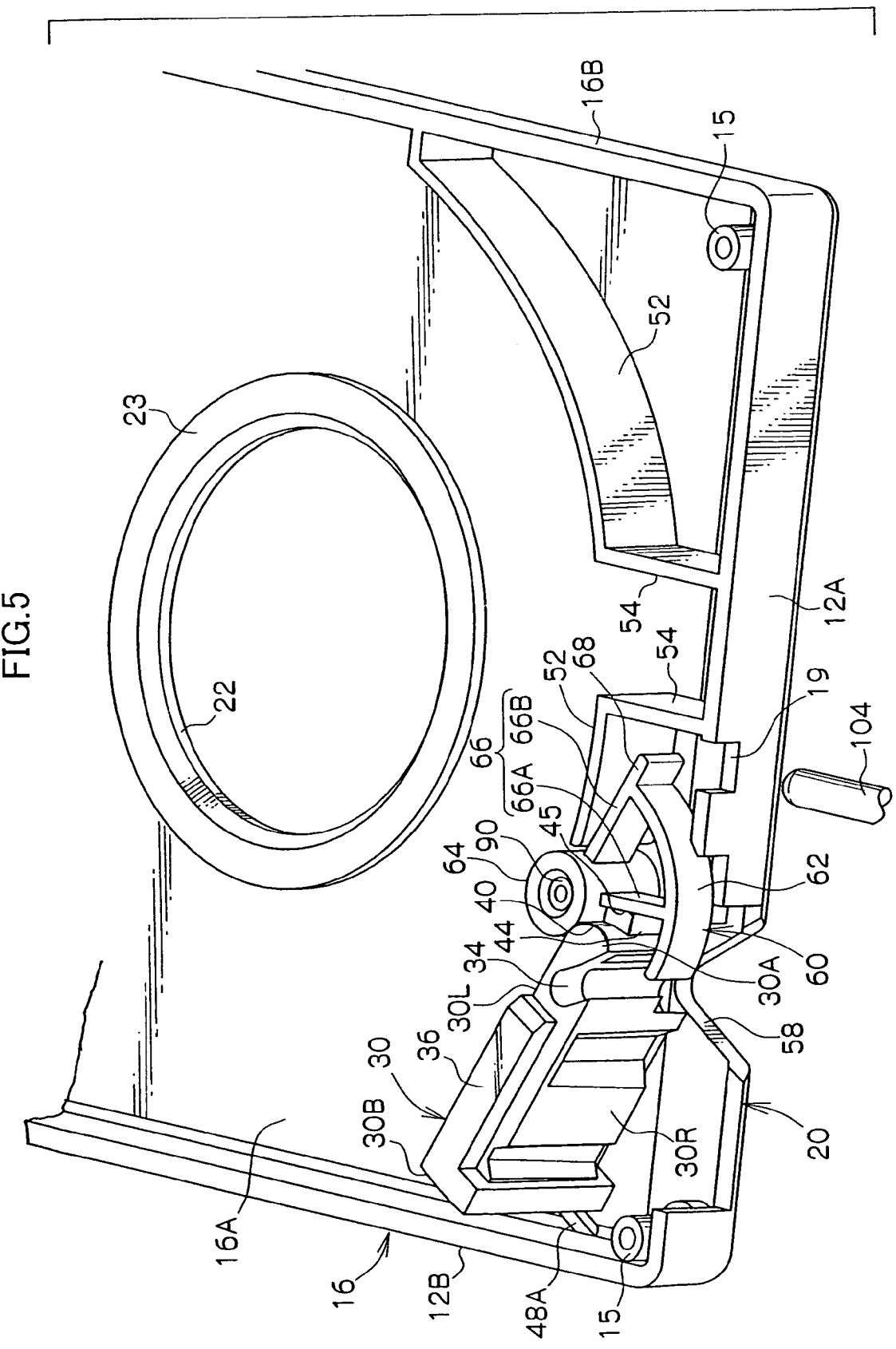
FIG. 5 is a schematic perspective view showing a state in which the leader block is covered by a cover member according to a modified example of the first embodiment.
Figure 6:
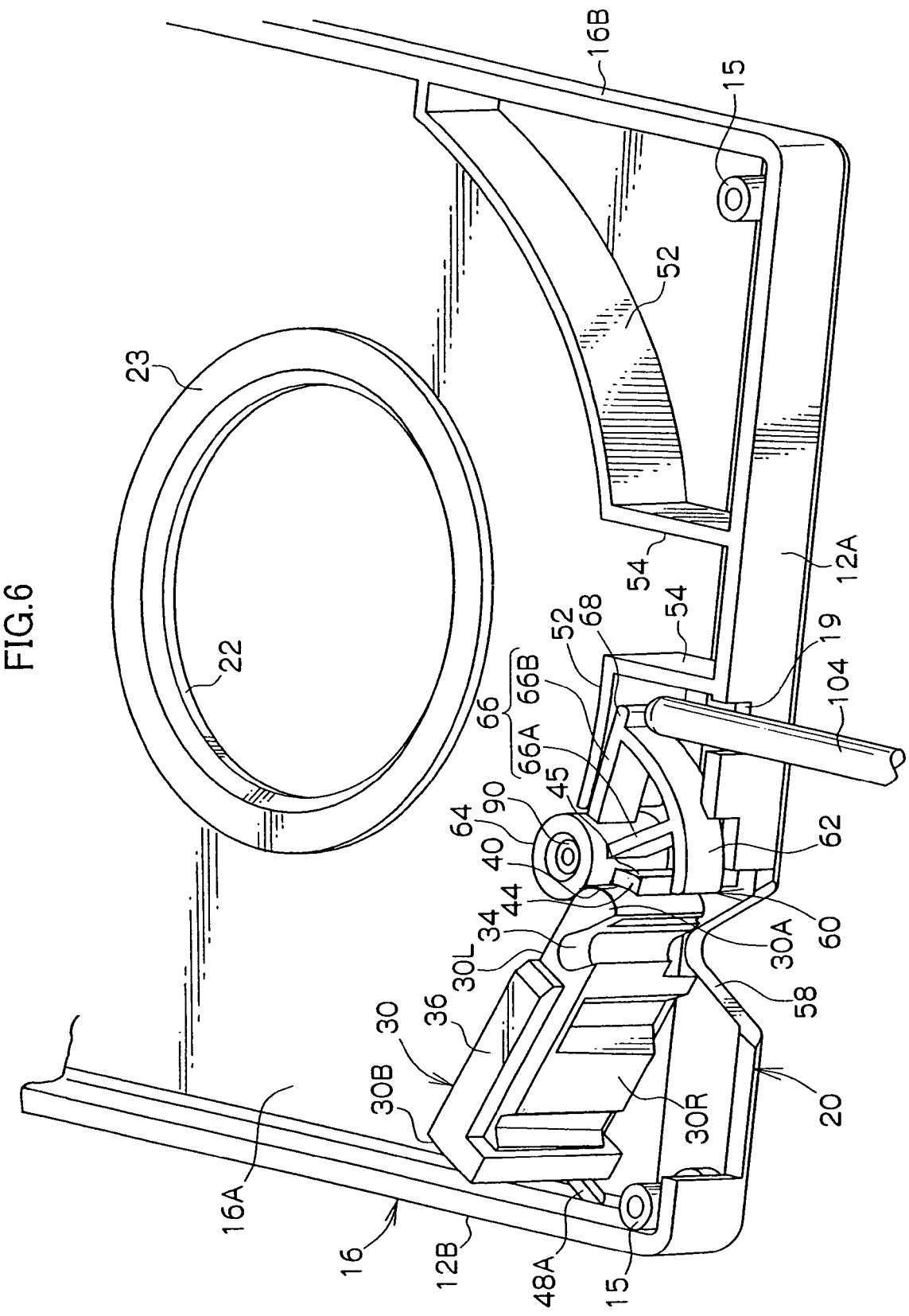
FIG. 6 is a schematic perspective view showing a state in which the cover member according to the modified example of the first embodiment is removed from the leader block by a release member which is inserted from a front side.

Now, the cover member 60 will be further described in detail. As shown in FIGS. 3 and 4, at the cover member 60, a covering portion 62, an axis tube portion 64 and arms 66 are integrally formed of a resin material. The covering portion 62 is formed in a circular arc shape, in plan view, with a predetermined length and a predetermined thickness. The axis tube portion 64 fits around the screw boss 90. The arms 66 are plurally provided (two in the illustrated case) in radial forms from an outer peripheral face of the axis tube portion 64, to connect the covering portion 62 with the axis tube portion 64. (Hereafter, the right side arm 66 is referred to as arm 66A and the left side arm 66 is referred to as arm 66B.) A height of the cover member 60 is formed to be slightly less than a height of the inner side of the front wall 12A.

Further, an engaging protrusion 68, which serves as an operation member for rotating the cover member 60, is provided at a predetermined position of the covering portion 62, for example, at a left end portion thereof, to protrude toward the front wall 12A (on a line extended from the left side arm 66B which is provided extending radially from the outer peripheral face of the axis tube portion 64).

One end of the urging member 50, which is a torsion spring or the like, is attached to (or abuts against) a left side end face of the cover member 60. Another end of this urging member 50 is attached to (or abuts against) an outer peripheral face of a free play-restricting wall 52 (see FIGS. 7 and 8), which is provided standing from the lower case 16 (and possibly from the upper case 14). As a result, the cover member 60 is continuously urged in a direction of covering the front end 30A, that is, in the rightward direction, by the urging member 50.

Here, the free play-restricting wall 52 is a wall which restricts play of the reel 18 that is accommodated in the case 12, and is connected with the peripheral walls 14B and 16B by a rib 54. With such a structure, strength of the upper case 14 and the lower case 16 can be improved.

A structure to which the other end of the urging member 50 is attached need not be the free play-restricting wall 52, and, for example, an unillustrated rib, pin or the like could be provided and the other end of the urging member 50 attached thereto (or abutted thereagainst).

Obviously, in a case in which the urging member 50 is a torsion spring, a pin or the like around which a coiled portion of the torsion spring is fitted (not shown) is provided protruding from an inner face of the case 12 (the ceiling plate 14A and/or the floor plate 16A).

Left side faces of the fitting walls 42 and 44 form a stopper surface 45 which restricts rotation of the cover member 60 in the rightward direction. Specifically, the rotation of the cover member 60 in the rightward direction is restricted by the right side arm 66A of the cover member 60 abutting against the stopper surface 45. Hence, the cover member 60 is a structure which can cover at least a portion of the leader block 30, for example, the front end 30A, in a state in which the arm 66A of the cover member 60 is abutting against the stopper surface 45.

An aperture 17 is formed through the floor plate 16A of the lower case 16. A release member 100, which engages with the engaging protrusion 68, will be inserted into the aperture 17. At a side of the release member 100 of a face thereof which will make contact with the engaging protrusion 68, a taper surface 102 is formed with a predetermined angle. In the state in which the cover member 60 is disposed at a rightmost side position thereof, the engaging protrusion 68 opposes the aperture 17.

With the structure described above, at times of non-use of the recording tape cartridge 10, the cover member 60 is continuously urged in the rightward direction by the urging member 50, and covers at least a portion of the leader block 30, for example, the front end 30A, in addition to which the cover member 60 narrows the aperture 20. Consequently, even if an impact is applied to the case 12 by dropping of the recording tape cartridge 10 or the like, the leader block 30 is prevented from flying out (detaching) from the case 12.

When the recording tape cartridge 10 is loaded at a drive device (at a time of use of the recording tape cartridge 10), the release member 100 provided at the drive device is inserted in through the aperture 17 formed through the floor plate 16A of the lower case 16, and the engaging protrusion 68 of the cover member 60 is pushed rearward. Because the taper surface 102 is formed at the release member 100, the engaging protrusion 68 of the cover member 60 slides along the taper surface 102. As a result, the cover member 60 rotates substantially rearward, against the urging force of the urging member 50.

Hence, as shown in FIG. 4, when the engaging protrusion 68 is moved to a rearward side by the release member 100, the front end 30A of the leader block 30 is released (i.e., the aperture 20 is completely opened), and it is possible to take the leader block 30 out from inside the case 12 (from the aperture 20).

Here, a releasing force with which the release member 100 pushes the engaging protrusion 68 is around 0.5 to 5 Newtons.

Means for rotating the cover member 60 is not limited to the aperture 17 which is formed through the floor plate 16A of the lower case 16 and the release member 100 which is inserted into the aperture 17. As shown in FIGS. 5 to 8, the means for rotating the cover member 60 may be structured by an aperture 19, which is formed through the front wall 12A, and a release member 104, which is inserted into this aperture 19.

Specifically, the release member 104 may be inserted in through the aperture 19 formed through the front wall 12A, may engage with the engaging protrusion 68, and may directly push the engaging protrusion 68 rearward against the urging force of the urging member 50. Accordingly, the cover member 60 will rotate substantially rearward (in a leftward direction), the front end 30A of the leader block 30 will be released, and it will be possible to take out the leader block 30.

Note that with such a structure, there is no need to form a taper surface at the release member 104. Naturally, forms of the cover member 60, forms of the apertures 17 and 19, forms of the release members 100 and 104, and the like are not limited to the forms shown in the drawings.

Next, operation of the recording tape cartridge 10 with the structure described above will be described. At times of non-use (times of storage, times of transport and the like at which the recording tape cartridge 10 is not loaded in a drive device), the aperture 20 is closed by the leader block 30. Further, the front end 30A of the leader block 30 is covered by the cover member 60, which is urged in the rightward direction by the urging member 50. Therefore, even if the recording tape cartridge 10 is accidentally dropped, the leader block 30 will not disengage from the aperture 20.

When the recording tape cartridge 10 is to be used, the front wall 12A side thereof is oriented forward, and the recording tape cartridge 10 is loaded into a drive device along the direction of arrow A. When the recording tape cartridge 10 is loaded (inserted) into the drive device, the recording tape cartridge 10 descends to a predetermined height, or a rotation shaft (not shown) which is provided in the drive device ascends to a predetermined height. The drive device side positioning pins enter into the positioning holes 24 and 26 and restrict a horizontal direction position of the recording tape cartridge 10 (in the front-rear and left-right directions). Further, the drive device side positioning surfaces abut against the reference surfaces 24A and 26A and restrict the position of the recording tape cartridge 10 in the height direction. Thus, the recording tape cartridge 10 is positioned in the drive device with high accuracy.

Further, at this time, the drive device side release member 100 (or the release member 104) enters in through the aperture 17 (or the aperture 19) and pushes the engaging protrusion 68 of the cover member 60 substantially rearward. In consequence, the cover member 60 rotates leftward (and substantially rearward) against the urging force of the urging member 50 and opens up the front end 30A of the leader block 30. Thus, the cover member 60 rotates in accordance with the loading of the recording tape cartridge 10 into the drive device, and ease of handling for users is not adversely affected when the cover member 60 is provided.

Then, the drive device side drawing-out member (not shown) engages with the engaging recess portion 34 of the leader block 30. At this time, because the recording tape cartridge 10 is positioned with high accuracy in the drive device and the cutaway portions 56 and 58 are formed in the case 12, the drawing-out member can engage with the engaging recess portion 34 of the leader block 30 reliably and simply.

Subsequently, the leader block 30 is drawn out from inside the case 12 by the drawing-out member moving toward the drive device side winding reel. At this time, because the leader block 30 has been disposed in the state which is angled at the predetermined angle α relative to the front wall 12A, the leader block 30 is drawn out along the shortest distance to the drive device side winding reel, and this drawing-out operation is completed in a short time.

The leader block 30 that has been drawn out from the recording tape cartridge 10 is guided to the winding reel in a state of engagement with the drawing-out member, and is accommodated in a fitting portion (not shown) which is formed in a winding surface of the winding reel. Here, the rear end 30B of the leader block 30, which is formed as a circular arc surface, structures a portion of the winding surface. Consequently, winding of the magnetic tape T around the drive device side winding reel is enabled.

Further, when the recording tape cartridge 10 descends to the predetermined height or the drive device side rotation shaft ascends to the predetermined height, a release member (not shown), which is provided at the rotation shaft, enters in through a through-hole 18A, which is formed through an axial center portion of the reel 18, and releases a locking mechanism which has been blocking undesired rotation. In addition, a driving gear formed at the rotation shaft (not shown) meshes with the reel gear 28.

Thereafter, when the driving gear rotates for driving and causes the reel 18 to rotate synchronously with the winding reel, the magnetic tape T is wound onto the winding reel while being sequentially drawn out from inside the recording tape cartridge 10. Recording and/or replaying of data (information) is carried out by a recording/replaying head, which is provided at a predetermined tape path. Of course, a guide roller or the like (not shown) is provided at a suitable position of the drive device for guiding the magnetic tape T that is drawn out from the recording tape cartridge 10, such that the magnetic tape T that is drawn out does not interfere with a right edge portion of the aperture 20 (i.e., the front wall 12A) at this time.

Subsequently, when the recording tape cartridge 10 is to be ejected from the drive device, first the magnetic tape T is wound back to the reel 18, and the leader block 30 is returned to the case 12. That is, the rear end 30B of the leader block 30 is abuttingly fitted at the fitting ribs 46A and 48A, the upper and lower end portions of the left side face 30L abut against the engaging ribs 46 and 48, and the front end 30A is fitted in at the recess portion 40 of the fitting walls 42 and 44.

When the aperture 20 is closed off by the leader block 30 in this manner, the recording tape cartridge 10 ascends or the rotation shaft descends, and the meshing of the driving gear with the reel gear 28 is released. In addition, the release member is withdrawn from the through-hole 18A, and the reel 18 is locked by the locking mechanism so as not to rotate undesiredly.

Further, the release member 100 (or the release member 104) is withdrawn through the aperture 17 (or the aperture 19), and in accordance therewith, the cover member 60 is rotated rightward (and substantially frontward) by the urging force of the urging member 50. Hence, the right side arm 66A abuts against the stopper surface 45, as a result of which the rightward rotation of the cover member 60 is restricted. In this state, the cover member 60 covers the front end 30A of the leader block 30.

Note that a portion of the leader block 30 that is covered by the cover member 60 is not limited to the front end 30A alone. For example, the engaging recess portion 34, a portion as far as approximately halfway along the leader block 30 (a substantially central vicinity of the right side face 30R), and the like may be covered. Further, the whole of the aperture 20 may be closed off by the cover member 60. In other words, it is sufficient that the cover member 60 is structured so as to reduce size of the aperture 20 to a degree such that the leader block 30 will not fall out through the aperture 20.

At the same time, the positioning pins are withdrawn from the positioning holes 24 and 26, and the state of positioning of the recording tape cartridge 10 relative to the drive device is released. Thereafter, the recording tape cartridge 10 is moved in a direction opposite to the direction of arrow A by an unillustrated ejection mechanism, and is ejected from inside the drive device.

As has been described above, at times of non-use, at least a portion (for example, the front end 30A) of the leader block 30 is covered by the cover member 60 (i.e., the size of the aperture 20 is narrowed). Therefore, even if the recording tape cartridge 10 is dropped or the like and an impact is applied to the case 12, problems such as the leader block 30 disengaging from the aperture 20 will not occur. Therefore, users will not be subjected to worry about unwanted detachment of the leader block 30.

Further, because the cover member 60 is provided to be rotatable in a horizontal direction, that is, a direction intersecting the height direction of the case 12, at the inner side of the front wall 12A, the cover member 60 does not take up space in the height direction of the case 12, and the cover member 60 can utilize dead space inside the case 12 effectively. Therefore, the recording tape cartridge 10 will not be made larger. Note that this cover member 60 can also be applied to a case with a leader tape.

Second Embodiment

Next, a second embodiment, shown in FIGS. 9 to 13, will be described. Components that are the same as in the first embodiment are assigned the same reference numerals, and descriptions thereof will be omitted. Moreover, because the principal features of operation are the same as in the first embodiment, descriptions thereof are accordingly omitted.

Figure 9:
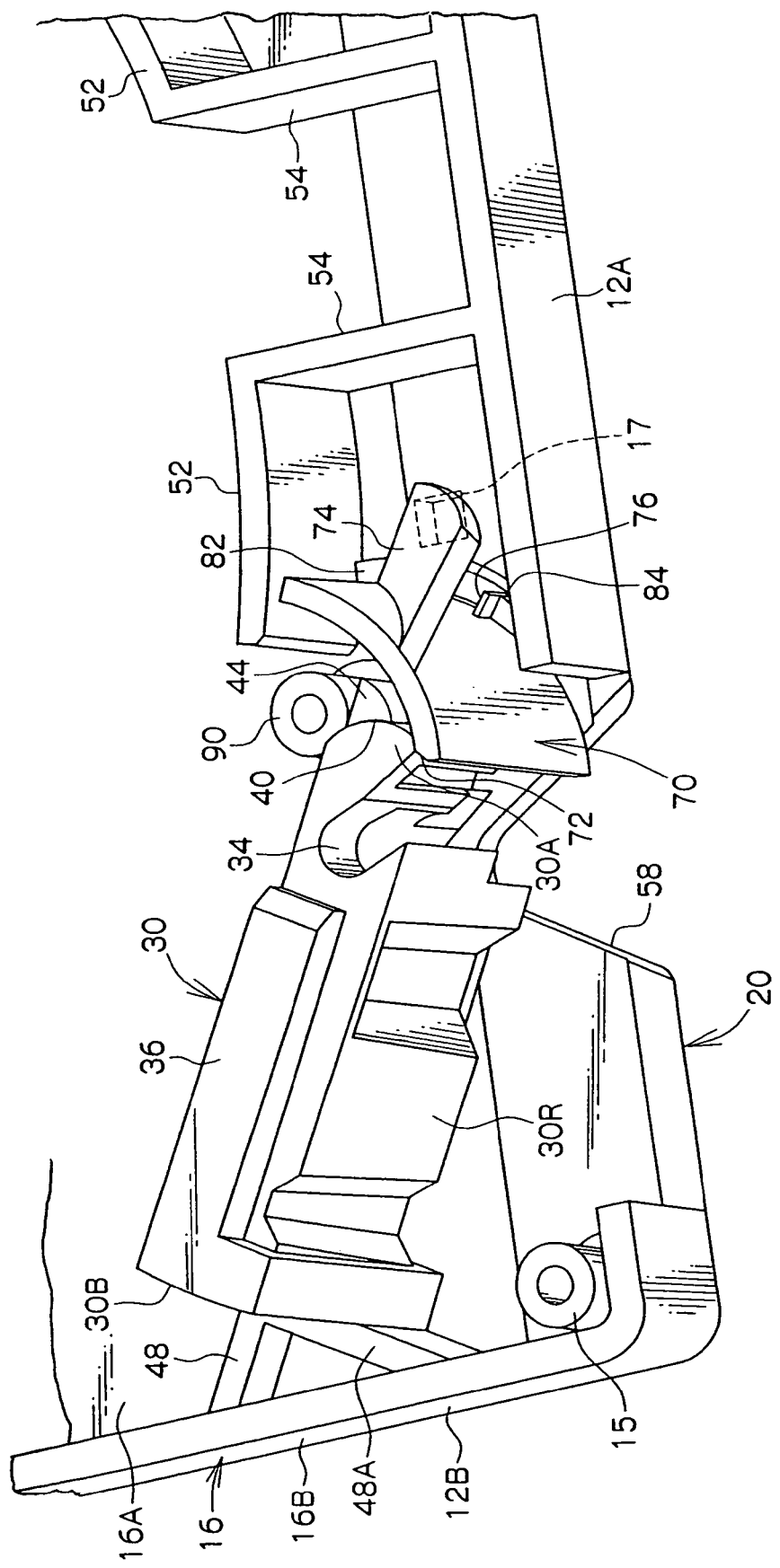
FIG. 9 is a schematic perspective view showing a state in which a leader block is covered by a cover member of a second embodiment of the present invention.
Figure 10:
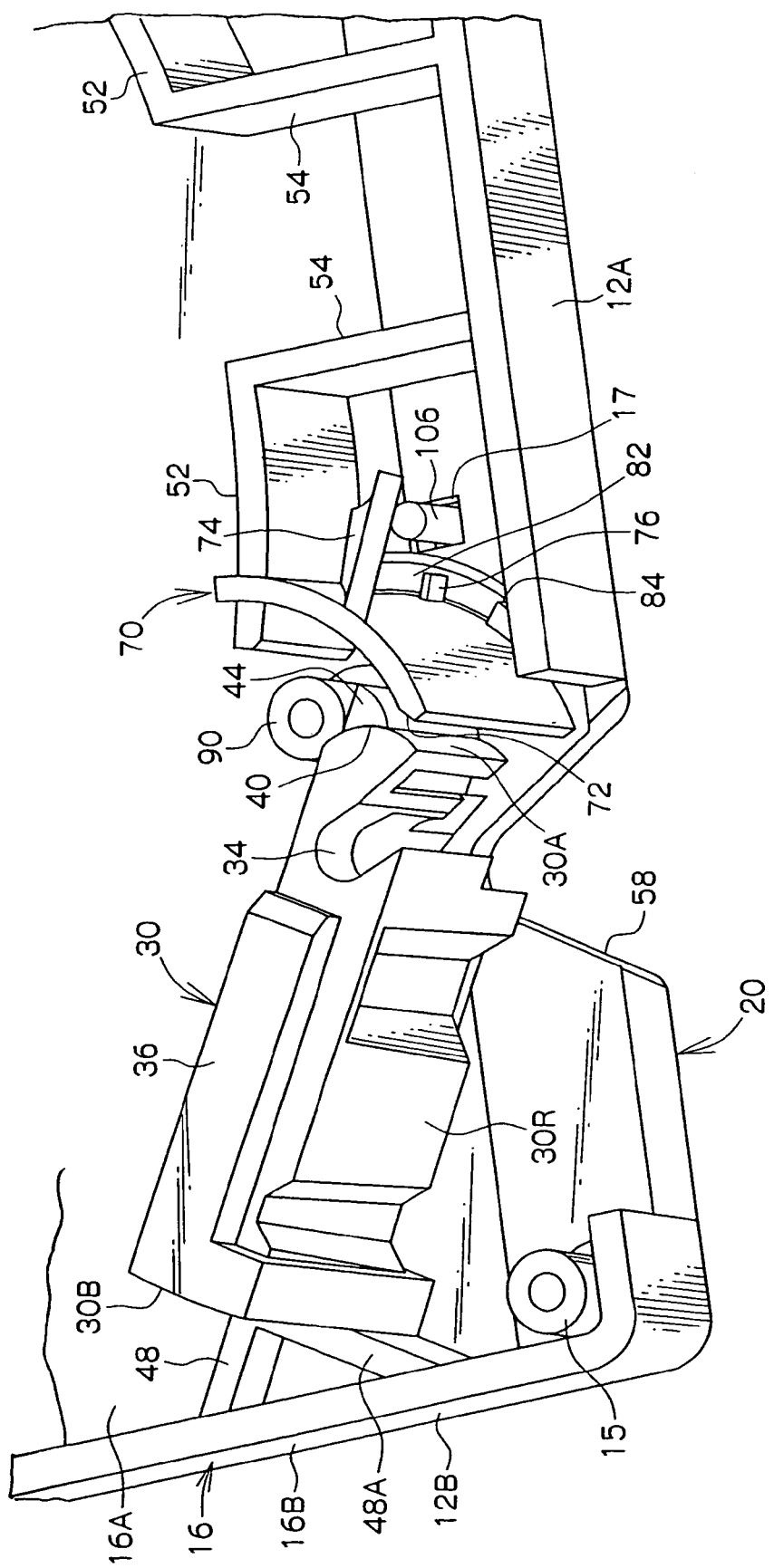
FIG. 10 is a schematic perspective view showing a state in which the cover member of the second embodiment is removed from the leader block by a release member which is inserted from below.

As shown in FIGS. 9 and 10, pairs of guide wall portions 80 and 82 (see FIGS. 12 and 13) are provided standing to predetermined heights from the ceiling plate 14A of the upper case 14 and the floor plate 16A of the lower case 16, in a vicinity of a left side end face of the fitting walls 42 and 44. The guide wall portions 80 and 82 are formed in circular arc forms in plan view, with predetermined lengths and predetermined thicknesses.

The guide wall portions 80 and 82 are provided to stand in parallel and be spaced apart by a spacing which is slightly wider than a thickness of a cover member 70, which is described later. Upper and lower end portions of the cover member 70 are inserted with play between the guide wall portions 80 and 82, and are slidable therebetween.

Furthermore, a frontward side (the front wall 12A side) from a predetermined position of the left side guide wall portions 82 is formed so as to have a height which is a predetermined height amount more than at a rearward side of the predetermined position. A step portion 84 is formed at this predetermined position. A stopper 76 of the later-described cover member 70 can be abutted against the step portion 84.

The cover member 70 is a plate piece which forms a circular arc form in plan view with a predetermined length and a predetermined thickness, and is formed with a height which is slightly less than a height of the inner side of the front wall 12A. Further, a taper surface 72 is formed at a distal end (right end) of the cover member 70, at a side thereof to the inside of the case 12. Thus, the cover member 70 does not interfere with the front end 30A when the cover member 70 is covering the leader block 30 (i.e., when the cover member 70 is sliding in a rightward direction).

Figure 12:
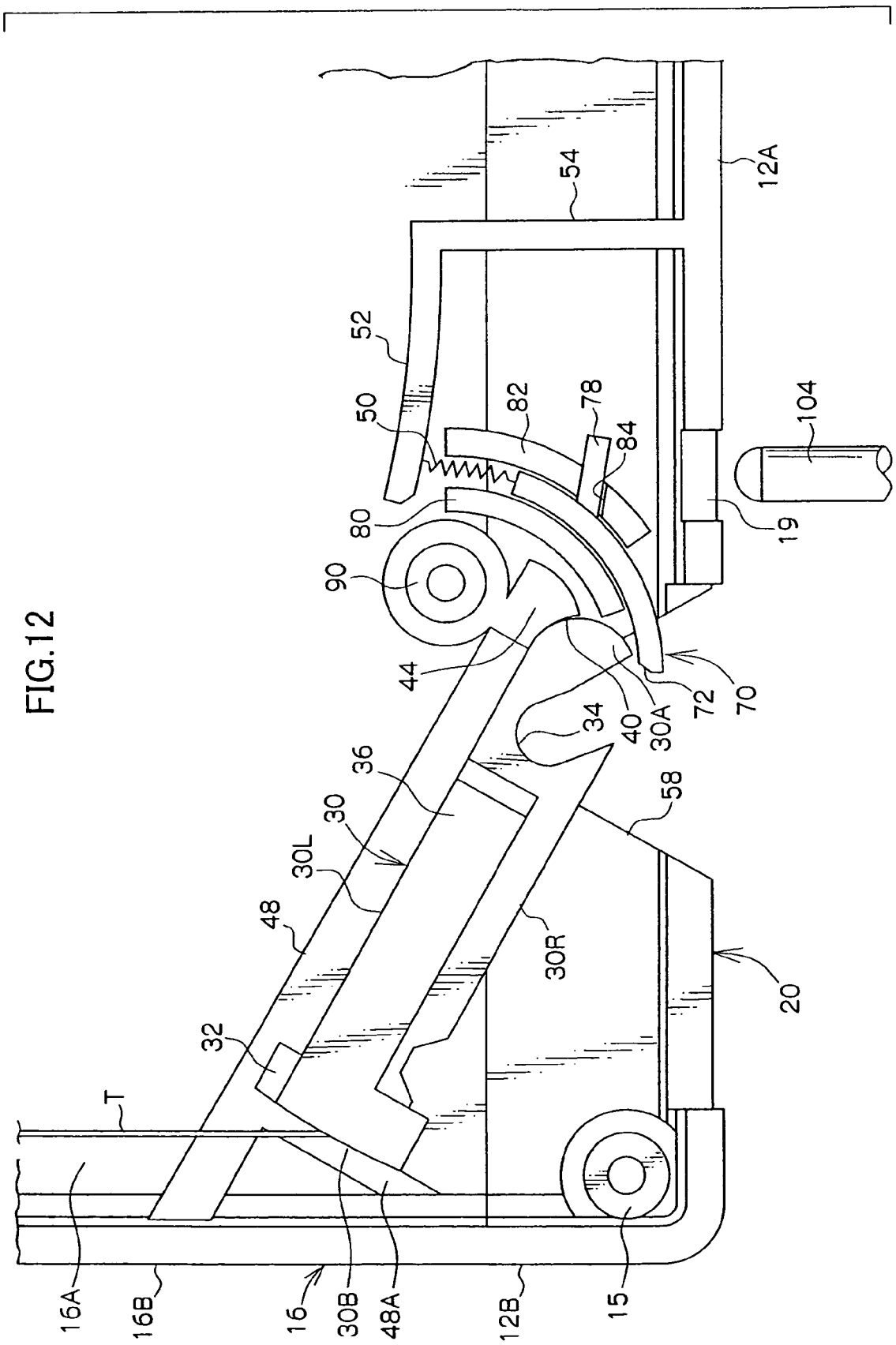
FIG. 12 is a schematic plan view showing the state in which the leader block is covered by the cover member according to the modified example of the second embodiment.
Figure 13:
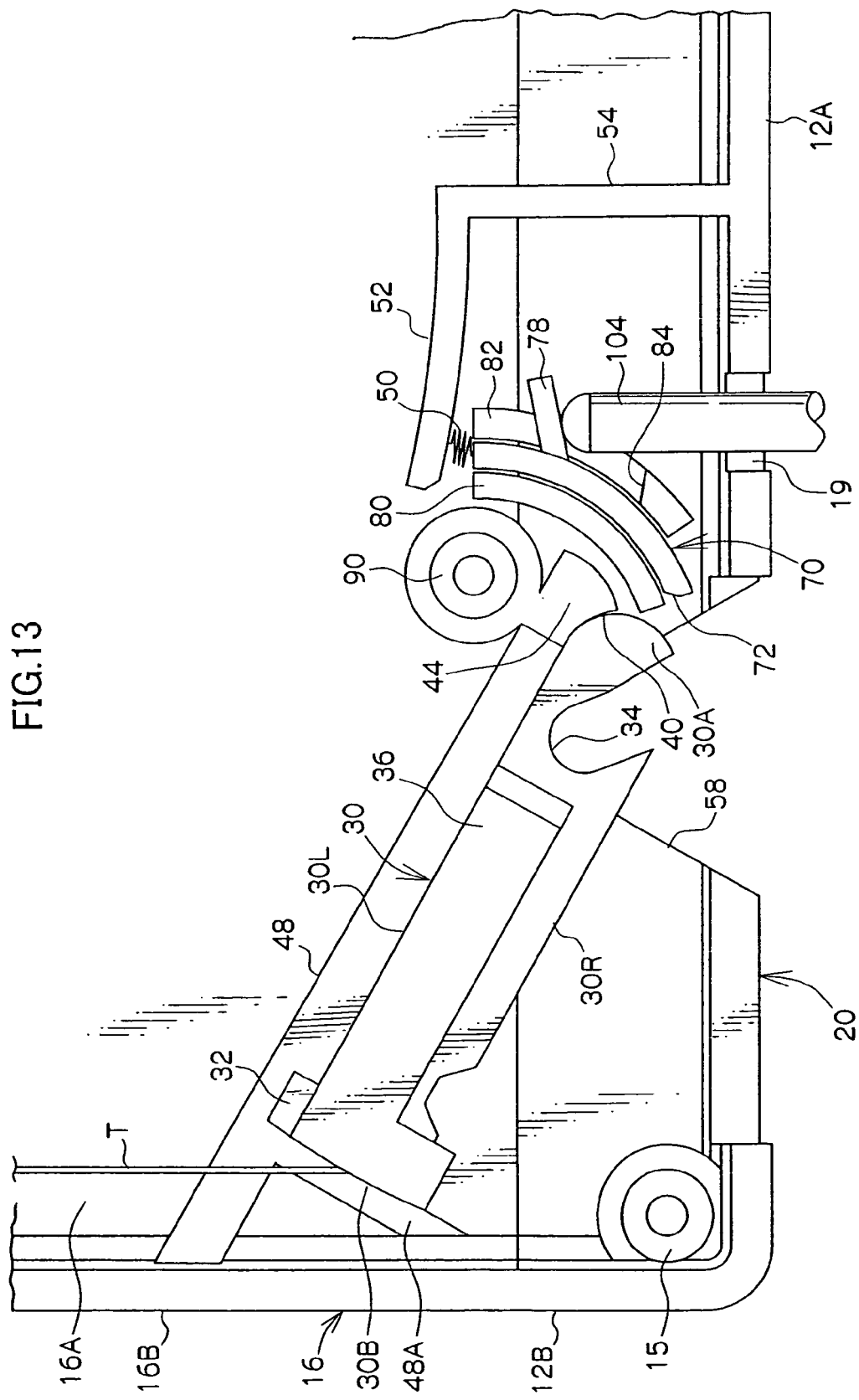
FIG. 13 is a schematic plan view showing a state in which the cover member according to the modified example of the second embodiment is removed from the leader block by a release member which is inserted from the front side.
Figure 14A:
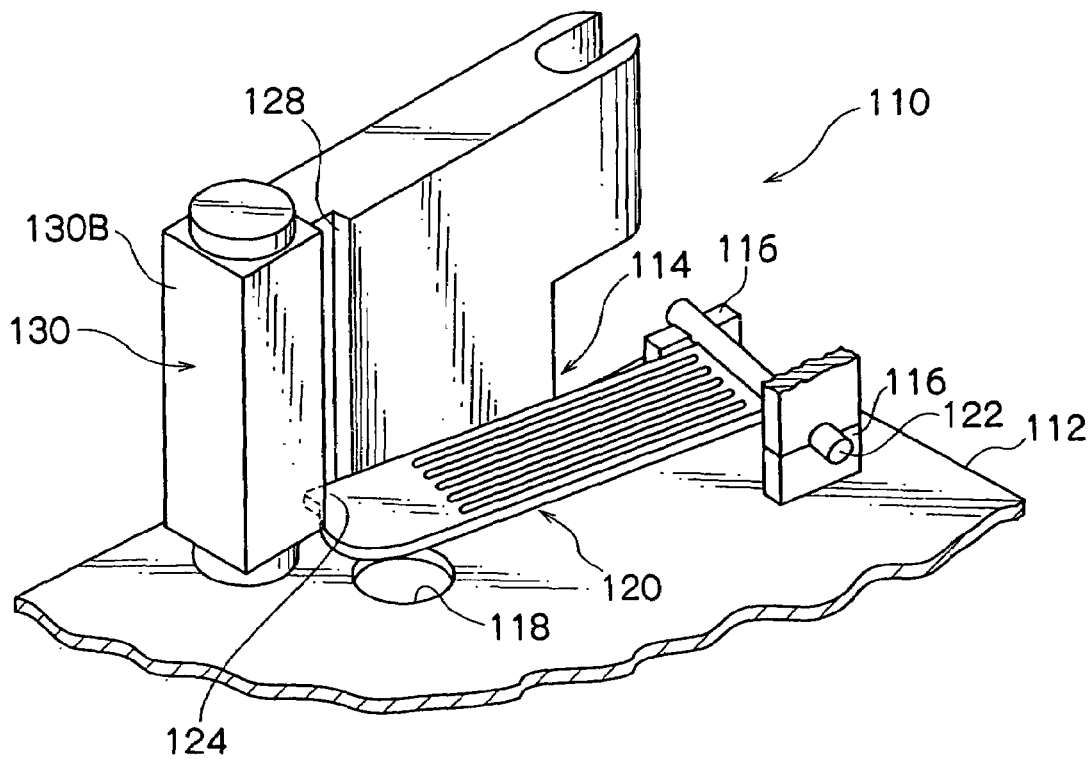
FIGS. 14A and 14B are schematic perspective views respectively showing conventional means for preventing detachment of a leader block.
Figure 14B:
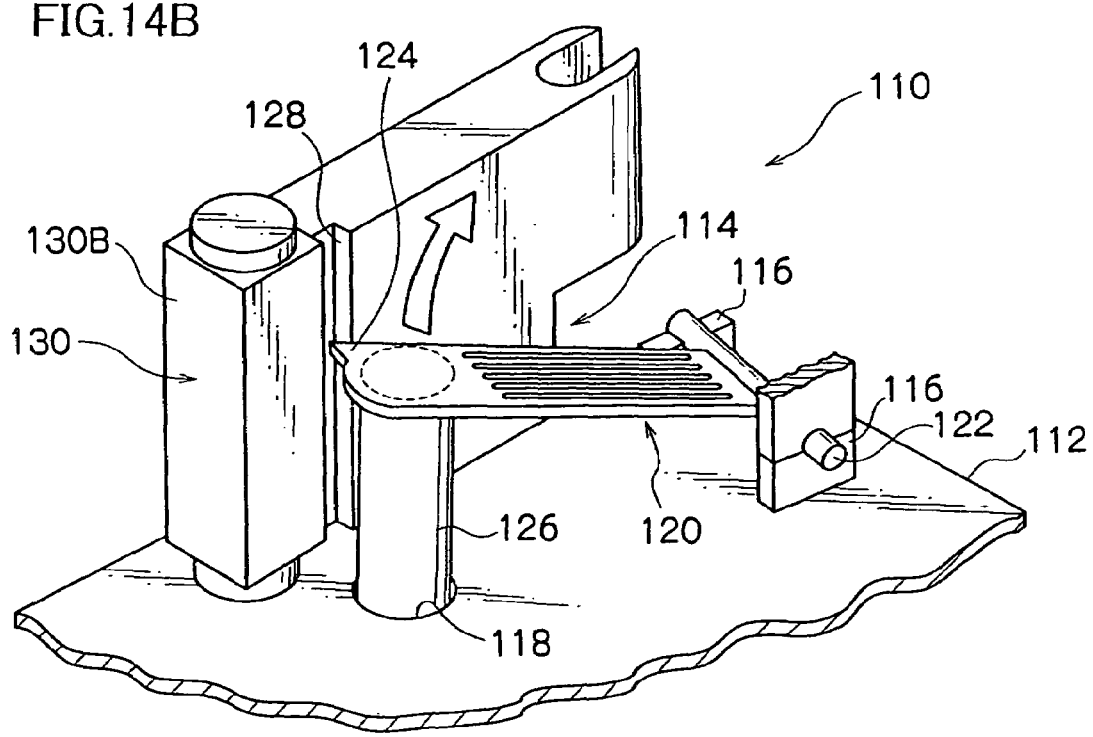
Figure 15A:
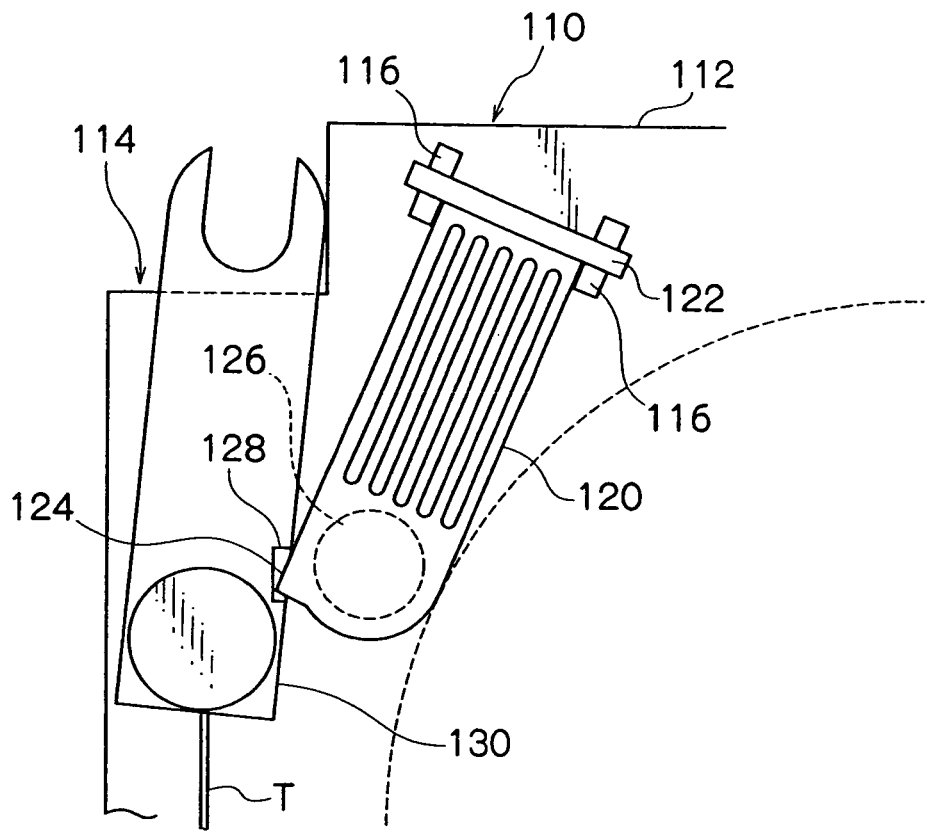
FIGS. 15A and 15B are schematic explanatory views respectively showing the conventional means for preventing detachment of a leader block.
Figure 15B:
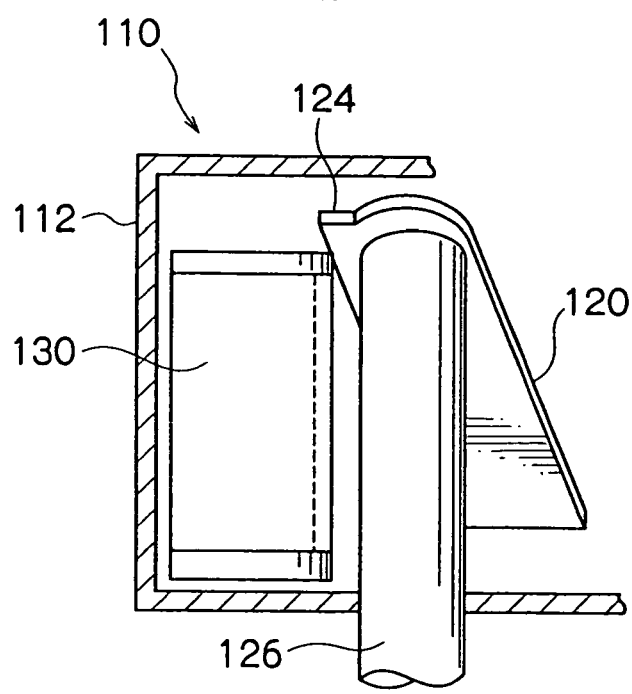

Further still, as shown in FIGS. 12 and 13, one end of the urging member 50 such as a torsion spring, a leaf spring, a coil spring or the like (a coil spring in the illustrated case) is attached to a left side end face of the cover member 70, and the other end of the urging member 50 is attached to the outer peripheral face of the free play-restricting wall 52. As a result, the cover member 70 is continuously urged in the direction of covering the front end 30A of the leader block 30, that is, in the rightward direction, by the urging member 50.

A structure to which the other end of the urging member 50 is attached need not be the free play-restricting wall 52, and, for example, an unillustrated rib, pin or the like could be provided and the other end of the urging member 50 attached thereto.

Further yet, a flat plate-form engaging protrusion 74 is provided protruding from a predetermined position of an outer peripheral face of the cover member 70. The engaging protrusion 74 engages with a release member 106 of a drive device. The engaging protrusion 74 is provided in a state which is angled upward to the right (downward to the left) at a predetermined angle relative to the horizontal direction (the front-rear direction/the left-right direction). Accordingly, the guide wall portions 80 and 82 are provided standing to heights that are high enough to be able to slidably support the upper and lower end portions of the cover member 70 (such that the cover member 70 will not disengage therefrom) but not so high as to interfere with the engaging protrusion 74.

The stopper 76 is provided protruding from a predetermined position of an outer peripheral face of the cover member 70. The stopper 76 abuts against the step portion 84 formed at the guide wall portion 82. When the stopper 76 abuts against the step portion 84, rightward sliding of the cover member 70 is restricted. Hence, the cover member 70 is structured so as to be able to cover at least a portion of the leader block 30, for example, the front end 30A, in the state in which the stopper 76 abuts against the step portion 84.

The aperture 17 is formed through the floor plate 16A of the lower case 16. The release member 106, which engages with the engaging protrusion 74, will be inserted through the aperture 17. A distal end of the release member 106 which will make contact with the engaging protrusion 74 is formed with a spherical surface form. In a state in which the cover member 70 is disposed at a rightmost side position thereof (the state in which the stopper 76 abuts against the step portion 84), the engaging protrusion 74 opposes the aperture 17.

With the structure described above, at times of non-use of the recording tape cartridge 10, the cover member 70 is continuously urged in the rightward direction by the urging member 50 and covers at least a portion of the leader block 30, for example, the front end 30A, in addition to which the cover member 70 narrows the aperture 20. Consequently, even if an impact is applied to the case 12 by dropping of the recording tape cartridge 10 or the like, the leader block 30 is prevented from flying out (detaching) from the case 12.

When the recording tape cartridge 10 is loaded at a drive device (at a time of use of the recording tape cartridge 10), the release member 106 provided at the drive device is inserted in through the aperture 17 formed through the floor plate 16A of the lower case 16, and the engaging protrusion 74 of the cover member 70 is moved rearward.

That is, because the engaging protrusion 74 is protrudingly provided in the state which is angled upward to the right (downward to the left) as mentioned above, when a lower face of the engaging protrusion 74 is pushed by the release member 106, the engaging protrusion 74 slides relatively rearward with respect to the release member 106.

As a result, the cover member 70 slides substantially rearward, against the urging force of the urging member 50, while being guided by the guide wall portions 80 and 82.

Hence, when the engaging protrusion 74 is moved to a rearward side by the release member 106, the front end 30A of the leader block 30 is released (i.e., the aperture 20 is completely opened), and it is possible to take the leader block 30 out from inside the case 12 (from the aperture 20).

Here, a releasing force with which the release member 106 pushes the engaging protrusion 74 is around 0.5 to 5 Newtons.

Figure 11:
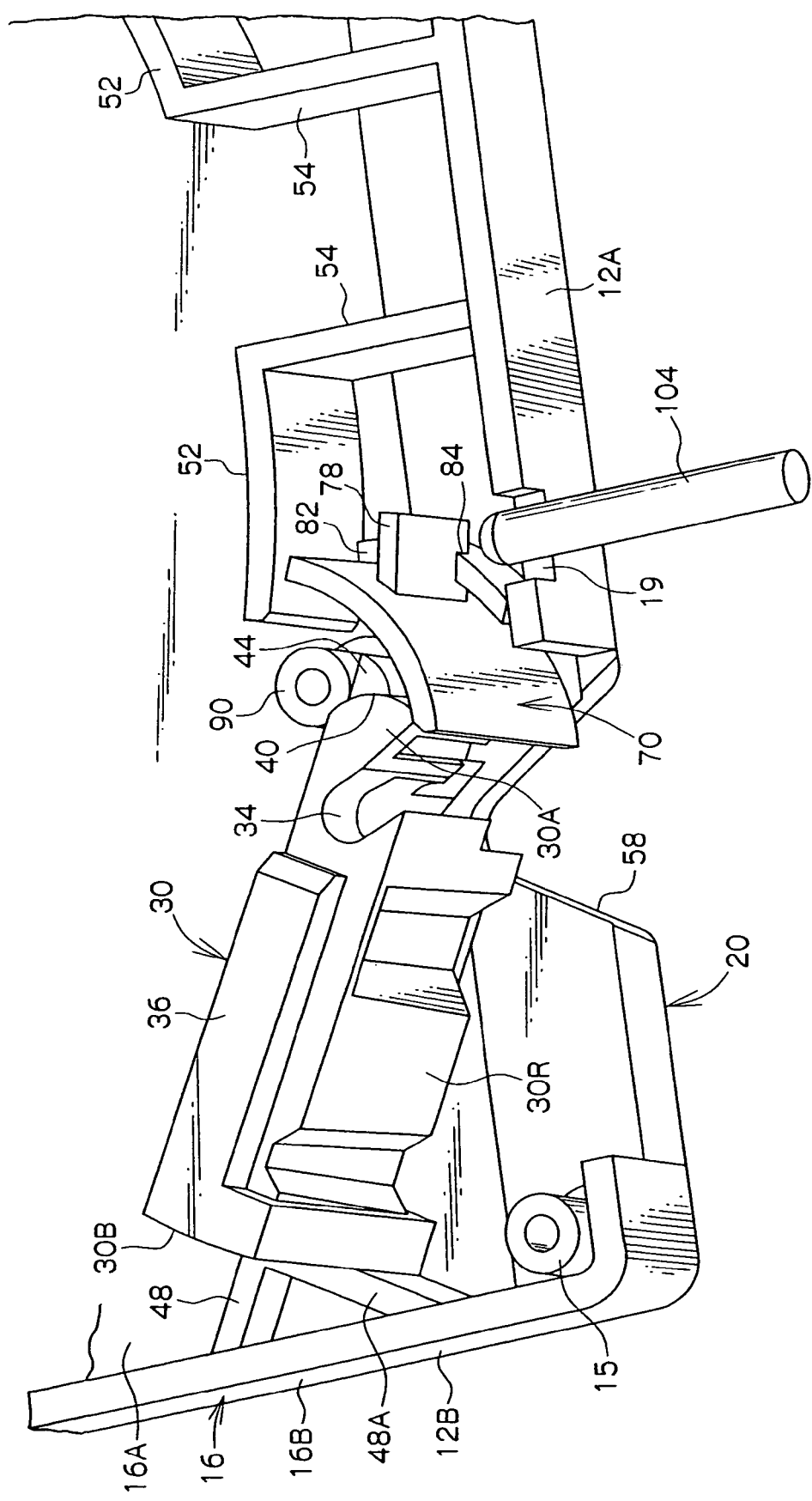
FIG. 11 is a schematic perspective view showing a state in which the leader block is covered by a cover member according to a modified example of the second embodiment.

Means for sliding the cover member 70 is not limited to the aperture 17 which is formed through the floor plate 16A of the lower case 16 and the release member 106 which is inserted into the aperture 17. As shown in FIGS. 11 to 13, the means for rotating the cover member 70 may be structured by the aperture 19, which is formed through the front wall 12A, and the release member 104, which is inserted into this aperture 19.

In such a case, a flat plate-form engaging protrusion 78 is provided protruding from the outer peripheral face of the cover member 70, and protrudes to be parallel with the height direction of the cover member 70. With such a structure, the release member 104 can be easily engaged with the engaging protrusion 78 by being inserted through the aperture 19 formed through the front wall 12A, and can directly push the engaging protrusion 78 substantially rearward against the urging force of the urging member 50. Consequently, the cover member 70 will slide substantially rearward, the front end 30A of the leader block 30 will be released, and it will be possible to take out the leader block 30.

Note that in the case of such a structure, the engaging protrusion 78 may abut against the step portion 84. Therefore, it is possible to omit the stopper 76 described above, which is advantageous.

Anyhow, in conclusion, at least a portion of the leader block 30 (for example, the front end 30A) is covered by the cover member 70 (i.e., the size of the aperture 20 is reduced) at times of non-use. Therefore, even if the recording tape cartridge 10 is dropped or the like and an impact is applied to the case 12, problems such as the leader block 30 disengaging from the aperture 20 will not occur. Therefore, users will not be subjected to worry about unwanted detachment of the leader block 30.

Further, because the cover member 70 is provided to be slidable in a horizontal direction, that is, a direction intersecting the height direction of the case 12, at the inner side of the front wall 12A, the cover member 70 does not take up space in the height direction of the case 12, and the cover member 70 can utilize dead space inside the case 12 effectively. Therefore, the recording tape cartridge 10 will not be made larger.

Note that forms of the cover member 70 and the guide wall portions 80 and 82 are not limited to the illustrated structures. For example, linear forms which are angled at a predetermined angle relative to the front wall 12A and the right wall 12B in plan view (for example, at an angle so as to form left-right symmetry with the leader block 30) are also possible.

Furthermore, forms of the apertures 17 and 19, forms of the release members 106 and 104, and the like are not limited to the illustrated structures and, similarly to the first embodiment, the cover member 70 can also be applied to a case with a leader tape.

What is claimed is:

1. A recording tape cartridge comprising:
   a case rotatably accommodating a single reel on which recording tape is wound;
   an aperture formed in the case, for drawing out the recording tape;
   a leader block fixed to an end portion of the recording tape, being capable of closing the aperture, and being drawn out by drawing-out means of a drive device at a time of drawing out the recording tape;
   a cover member covering at least a portion of the leader block that is closing the aperture; and
   a support point portion protruding from the case and supporting the cover member to be rotatable in a direction intersecting a height direction of the case.

2. The recording tape cartridge of claim 1, wherein the cover member comprises structure such that the cover member rotates in a direction for releasing the leader block in accordance with loading of the cartridge into the drive device.

3. The recording tape cartridge of claim 1, wherein the cover member is urged in a direction for covering the leader block.

4. The recording tape cartridge of claim 3, wherein the cover member comprises an axis tube portion which is axially supported at the support point portion, a covering portion which is formed in a substantially circular arc form, and a connecting portion which connects the covering portion to the axis tube portion, the covering portion being structured to be reciprocally movable, in accordance with loading and unloading of the cartridge at the drive device, between a release position for releasing the leader block and a covering position for covering the at least a portion of the leader block.

5. The recording tape cartridge of claim 4, further comprising a wall portion which engages with the connecting portion at a time of unloading of the cartridge at the drive device, thereby retaining the covering portion at the covering position.

6. The recording tape cartridge of claim 4, wherein the covering portion comprises an engaging protrusion, and another aperture is formed in the case, the another aperture corresponding with a position of the engaging protrusion when the covering portion is at the covering position.

7. The recording tape cartridge of claim 6, wherein the engaging protrusion and the another aperture are structured such that, at a time of loading into the drive device, a portion of the drive device advances in through the another aperture and the engaging protrusion is pushed by the portion of the drive device for moving the covering portion toward the release position.

8. The recording tape cartridge of claim 1, wherein the case is formed by joining together an upper case and a lower case by screw-fixing, and the support point portion is a screw boss thereof.

9. The recording tape cartridge of claim 1, wherein a height of the cover member is slightly less than a height of the case.

10. A recording tape cartridge comprising:
    a case rotatably accommodating a single reel on which recording tape is wound;
    an aperture formed in the case, for drawing out the recording tape;
    a leader block fixed to an end portion of the recording tape, being capable of closing the aperture, and being drawn out by drawing-out means of a drive device at a time of drawing out the recording tape;
    a cover member covering at least a portion of the leader block that is closing the aperture; and
    a guide wall portion standing from the case and supporting the cover member to be slidable in a direction intersecting a height direction of the case.

11. The recording tape cartridge of claim 10, wherein the cover member comprises structure such that the cover member slides in a direction for releasing the leader block in accordance with loading of the cartridge into the drive device.

12. The recording tape cartridge of claim 10, wherein the cover member is urged in a direction for covering the leader block.

13. The recording tape cartridge of claim 12, wherein the cover member comprises a covering portion formed in a substantially circular arc form, the covering portion being structured to be reciprocally movable along the guide wall portion, in accordance with loading and unloading of the cartridge at the drive device, between a release position for releasing the leader block and a covering position for covering the at least a portion of the leader block.

14. The recording tape cartridge of claim 13, wherein the covering portion comprises an engaging protrusion, the guide wall portion includes a step portion, and the engaging protrusion and the step portion are structured such that, at a time of unloading of the cartridge at the drive device, the engaging protrusion is engaged by the step portion, thereby retaining the covering portion at the covering position.

15. The recording tape cartridge of claim 14, wherein another aperture is formed in the case, the another aperture corresponding with a position of the engaging protrusion when the covering portion is at the covering position.

16. The recording tape cartridge of claim 15, wherein the engaging protrusion and the another aperture are structured such that, at a time of loading into the drive device, a portion of the drive device advances in through the another aperture and the engaging protrusion is pushed by the portion of the drive device for moving the covering portion toward the release position.

17. The recording tape cartridge of claim 14, wherein the covering portion comprises another engaging protrusion, and another aperture is formed in the case, the another aperture corresponding with a position of the another engaging protrusion when the covering portion is at the covering position.

18. The recording tape cartridge of claim 17, wherein the another engaging protrusion and the another aperture are structured such that, at a time of loading into the drive device, a portion of the drive device advances in through the another aperture and the another engaging protrusion is pushed by the portion of the drive device, for moving the covering portion toward the release position.

19. The recording tape cartridge of claim 10, wherein a height of the cover member is slightly less than a height of the case.

20. A recording tape cartridge comprising:
a case rotatably accommodating a single reel on which recording tape is wound;
an aperture formed in the case, for drawing out the recording tape;
a leader block fixed to an end portion of the recording tape, being capable of closing the aperture, and being drawn out by drawing-out means of a drive device at a time of drawing out the recording tape; and
a cover member covering at least a portion of the leader block that is closing the aperture,
wherein the cover member includes at least a covering portion formed in a substantially circular arc form, the covering portion being structured to be reciprocally movable in a direction intersecting a height direction of the case, around a point in a vicinity of the leader block, between a release position for releasing the leader block and a covering position for covering the at least a portion of the leader block.

21. The recording tape cartridge of claim 20, wherein the cover member is urged in a direction for covering the leader block.

22. The recording tape cartridge of claim 21, wherein the cover member comprises a support point portion protruding from the case, an axis tube portion which is axially supported at the support point portion, the covering portion which is formed in the substantially circular arc form, and a connecting portion which connects the covering portion to the axis tube portion.

23. The recording tape cartridge of claim 21, further comprising a guide wall portion standing from the case and supporting the cover member to be slidable in the direction intersecting the height direction of the case, the covering portion being structured to be reciprocally movable along the guide wall portion.

* * * * *